(12) United States Patent
Ashok et al.

(10) Patent No.: US 7,565,398 B2
(45) Date of Patent: Jul. 21, 2009

(54) PROCEDURE FOR DYNAMIC RECONFIGURATION OF RESOURCES OF LOGICAL PARTITIONS

(75) Inventors: Shamsundar Ashok, Austin, TX (US); Robert Kimberlin Foster, Austin, TX (US); Walter Manfred Lipp, Georgetown, TX (US); Minh Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 10/185,695

(22) Filed: Jun. 27, 2002

(65) Prior Publication Data

US 2004/0003063 A1    Jan. 1, 2004

(51) Int. Cl.
*G06F 15/16* (2006.01)
(52) U.S. Cl. .................. 709/203; 709/201; 709/202; 714/3
(58) Field of Classification Search .................. 709/203
See application file for complete search history.

(56) References Cited

U.S. PATENT DOCUMENTS

| 6,647,508 | B2 * | 11/2003 | Zalewski et al. | 714/3 |
| 6,725,317 | B1 * | 4/2004 | Bouchier et al. | 710/312 |
| 6,871,264 | B2 * | 3/2005 | Soltis, Jr. | 711/122 |

FOREIGN PATENT DOCUMENTS

| JP | 64-002145 | 1/1989 |
| JP | 03-282828 | 12/1991 |
| JP | 07-295841 | 11/1995 |
| JP | 10-293695 | 11/1998 |
| JP | 2000-172515 | 6/2000 |
| JP | 2000-311129 | 11/2000 |

OTHER PUBLICATIONS

Oehler et al, Computer System Partitioning Using Data Transfer Routing Mechanism, US Patent Pub No. 2003/0037224, All pages.*

* cited by examiner

*Primary Examiner*—John Follansbee
*Assistant Examiner*—Glenford Madamba
(74) *Attorney, Agent, or Firm*—Volel Emile; Diana R. Gerhardt

(57) ABSTRACT

A method, system and apparatus for dynamically reconfiguring partitions of a partitioned computer system are provided. Here, dynamically reconfiguring a partition is defined as being able to reconfigure the partition while the partition is operational. Using a graphical user interface (GUI), a user may indicate a plurality of resources that are to be involved in a partition reconfiguration. However, the partition is actually reconfigured one resource at a time. If one of the resources is memory, then memory is allocated to the partition or de-allocated from the partition one logical memory block (LMB) at a time. In reconfiguring partitions, resources may be removed, added or moved from one partition to another. Moving resources from one partition to another entails removing the resources from one partition and adding it to the other partition. After a partition re-configuration, a resource allocation table is updated. All this is done transparently to the user.

12 Claims, 19 Drawing Sheets

PROCEDURE FOR DYNAMIC RECONFIGURATION OF RESOURCES OF LOGICAL PARTITIONS

BACKGROUND OF THE INVENTION

1. Technical Field

The present invention is directed to a method and apparatus for managing a computer system. More specifically, the present invention is directed to a procedure for dynamically reconfiguring resources of logical partitions.

2. Description of Related Art

Presently, many computer manufacturers design computer systems with partitioning capability. To partition a computer system is to divide the computer system's resources (i.e., memory devices, processors etc.) into groups; thus, allowing for a plurality of operating systems (OSs) to be concurrently executing on the computer system.

Partitioning a computer system may be done for a variety of reasons. Firstly, it may be done for consolidation purposes. Clearly consolidating a variety of computer systems into one by running multiple application programs that previously resided on the different computer systems on only one reduces (i) cost of ownership of the system, (ii) system management requirements and (iii) footprint size.

Secondly, partitioning may be done to provide production environment and test environment consistency. Once a new OS or application program has been tested and certified, the test partition may simply be designated as a production partition, with resources diverted to it as needed. This, in turn, may inspire more confidence that an application program that has been tested successfully will perform as expected.

Thirdly, partitioning a computer system may provide increased hardware utilization. For example, when an application program does not scale well across large numbers of processors, running multiple instances of the program on separate smaller partitions may provide better throughput.

Fourthly, partitioning a system may provide application program isolation. When application programs are running on different partitions, they are guaranteed not to interfere with each other. Thus, in the event of a failure in one partition, the other partitions will not be affected. Furthermore, none of the application programs may consume an excessive amount of hardware resources. Consequently, no application programs will be starved out of required hardware resources.

Lastly, partitioning provides increased flexibility of resource allocation. A workload that has resource requirements that vary over a period of time may be managed more easily if it is being run on a partition. That is, the partition may be easily altered to meet the varying demands of the workload.

Computer systems with partitioning capability generally use a partitioning management tool. The partitioning management tool is usually associated with the hardware of the system and interacts with a service processor embedded in the computer system. One particular partitioning management tool is a hardware management console (HMC). The HMC is used to configure and monitor partitions.

Presently, however, one resource is handled at a time when a partition is being reconfigured. This can be a rather time-consuming endeavor when a plurality of partitions each containing numerous resources have to be reconfigured.

Therefore, what is needed is a method, apparatus and system for handling multiple resources when a partition is being reconfigured.

SUMMARY OF THE INVENTION

The present invention provides a method, system and apparatus for dynamically reconfiguring partitions of a partitioned computer system. Here, dynamically reconfiguring a partition is defined as being able to reconfigure the partition while the partition is operational. Using a graphical user interface (GUI), a user may indicate a plurality of resources that are to be involved in a partition reconfiguration. However, the partition is actually reconfigured one resource at a time. If one of the resources is memory, then memory is allocated to the partition or de-allocated from the partition one logical memory block (LMB) at a time. In reconfiguring partitions, resources may be removed, added or moved from one partition to another. Moving resources from one partition to another entails removing the resources from one partition and adding it to the other partition. After a partition re-configuration, a resource allocation table is updated. All this is done transparently to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
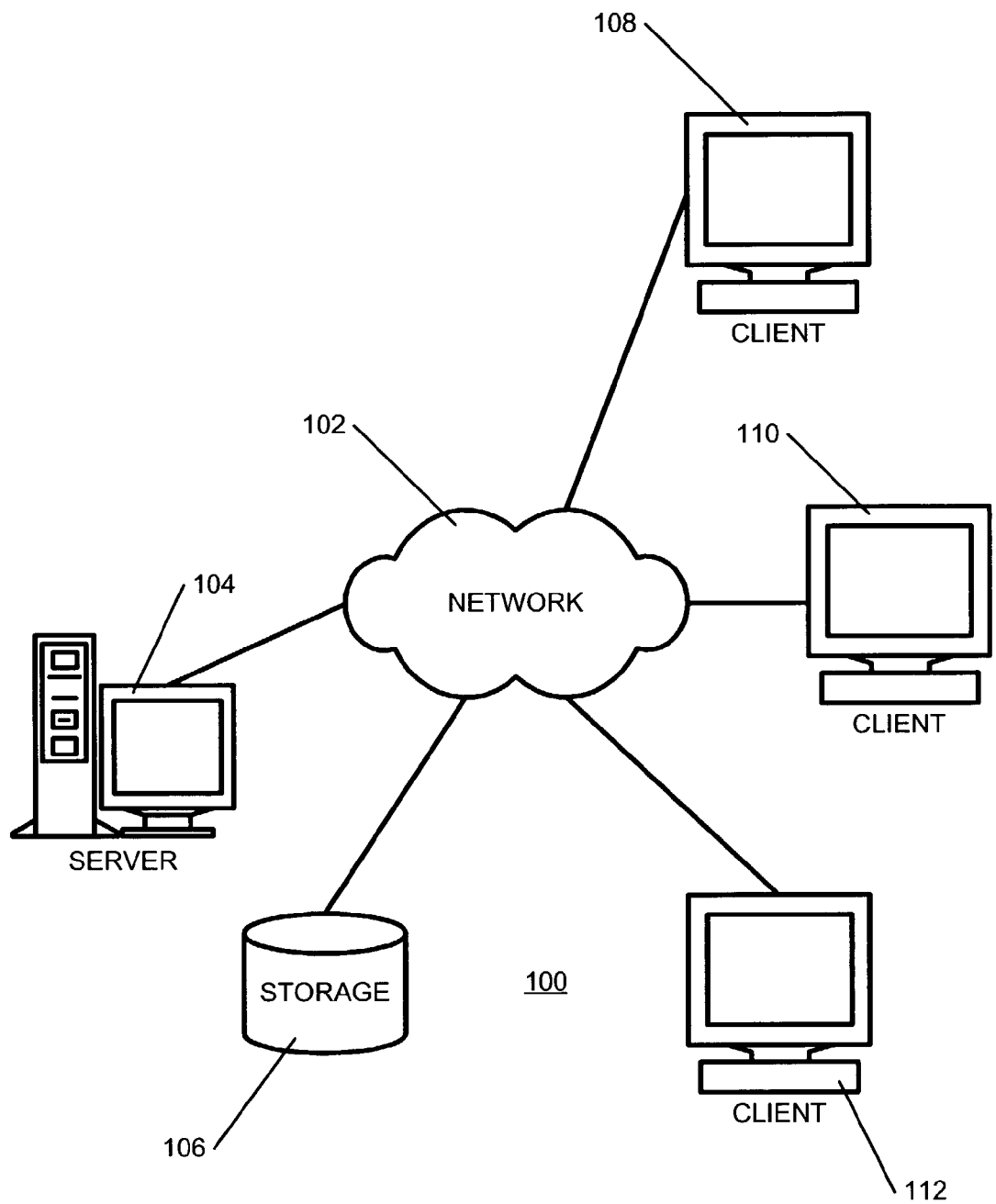
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
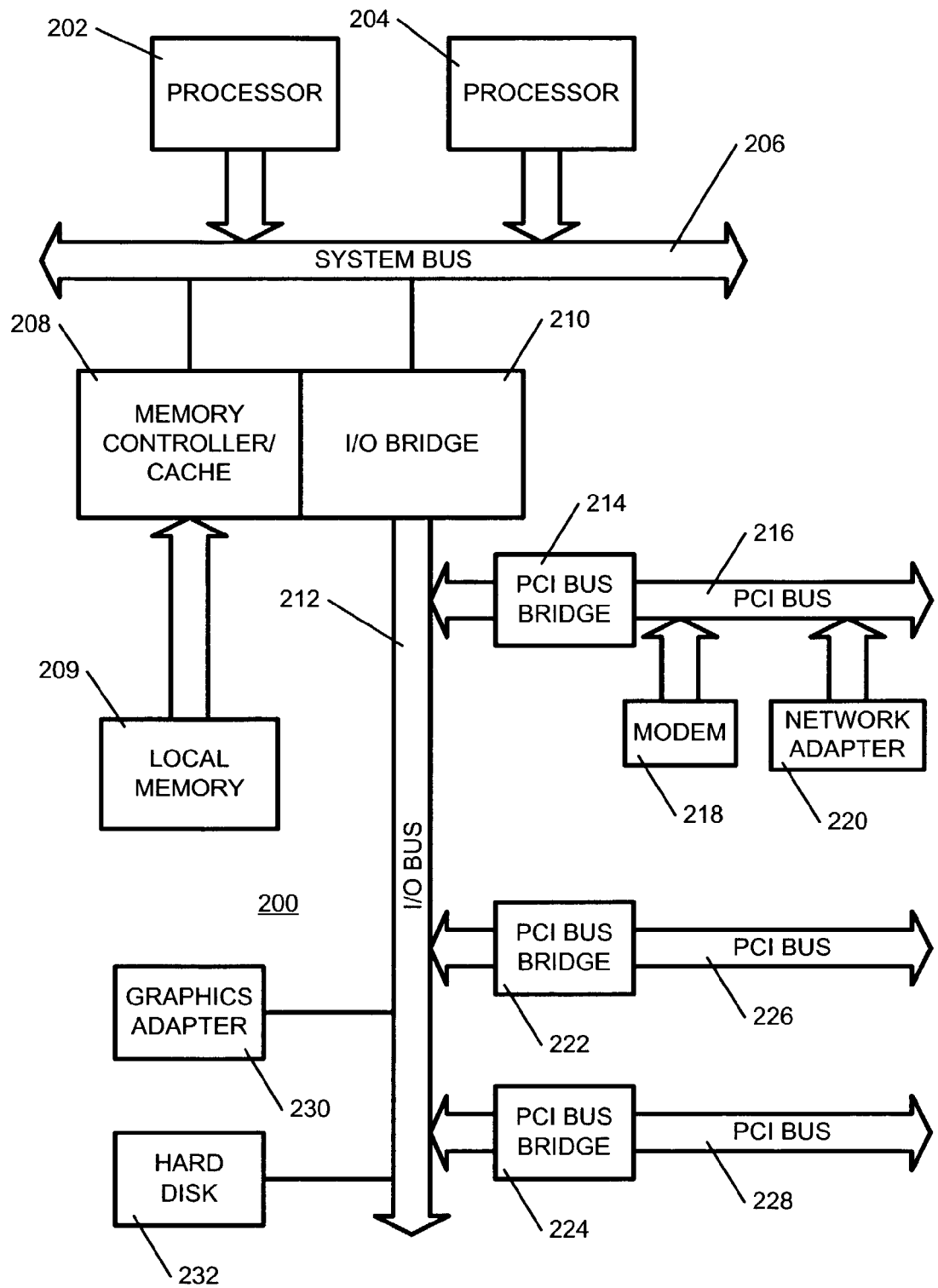
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or Linux operating system.

Figure 3:
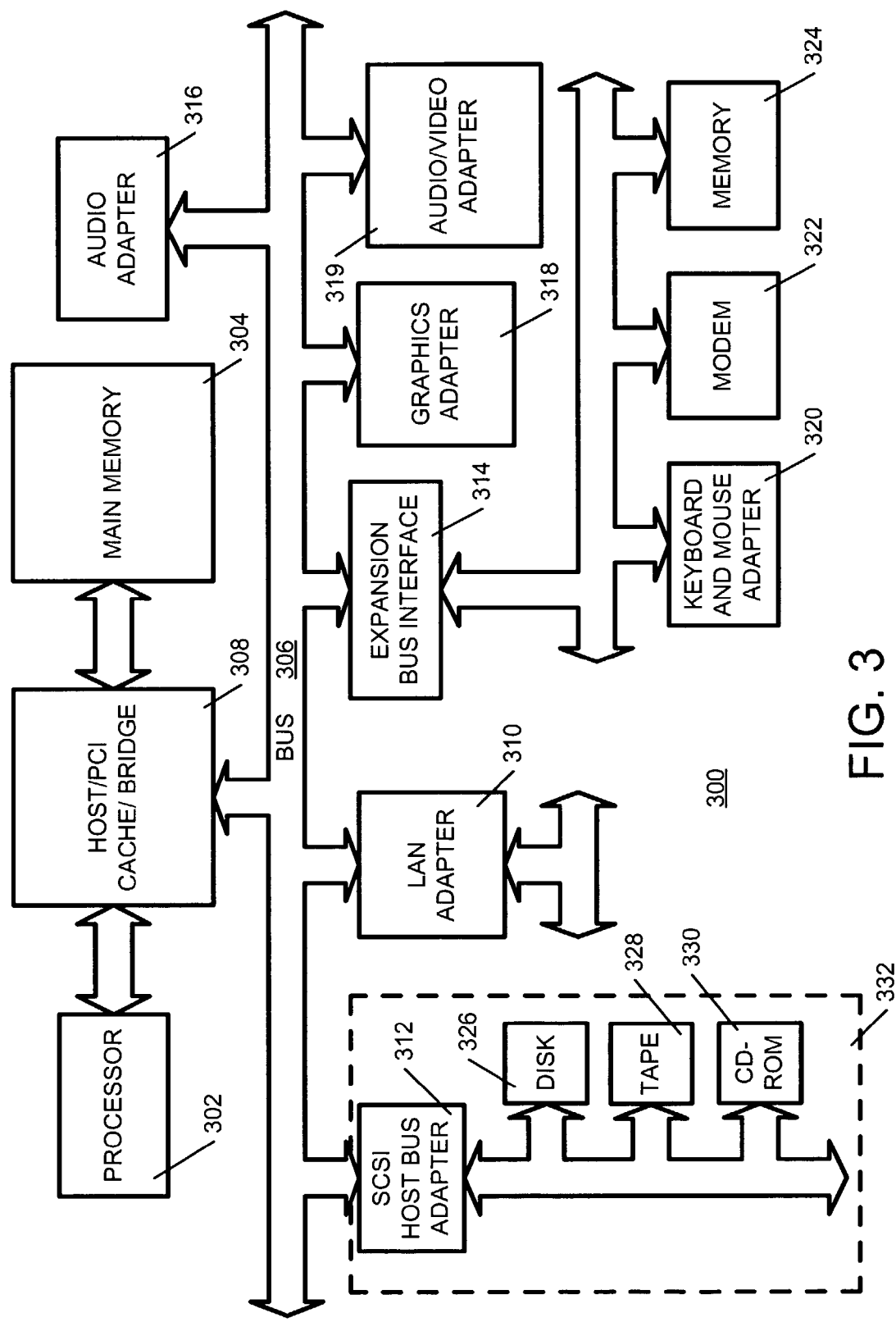
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of handling multiple resources when configuring a partition. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
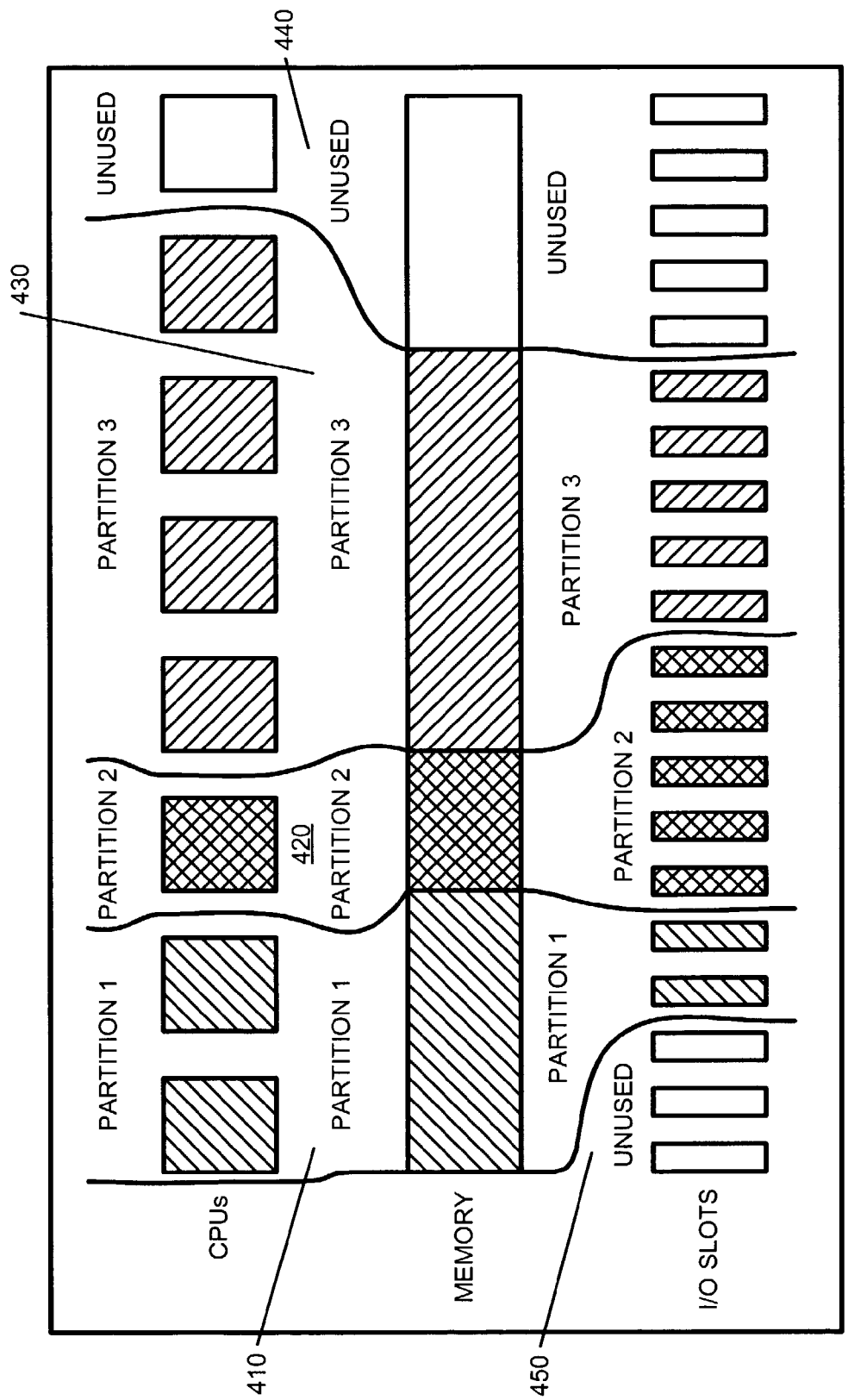
FIG. 4 illustrates logical a plurality of partitions of a computer system.

FIG. 4 illustrates a plurality of partitions of a computer system. Partition 1 410 has two (2) processors, two (2) I/O slots and use a percentage of the memory device. Partition 2 420 uses one (1) processor, five (5) I/O slots and also uses a smaller percentage of the memory device. Partition 3 430 uses four (4) processors, five (5) I/O slots and uses a larger percentage of the memory device. Areas 440 and 450 of the computer system are not assigned to a partition and are unused. Note that in FIG. 4 only subsets of resources needed to support an operating system are shown.

As shown, when a computer system is partitioned its resources are divided among the partitions. The resources that are not assigned to a partition are not used. More specifically, a resource may either belong to a single partition or not belong to any partition at all. If the resource belongs to a partition, it is known to and is only accessible to that partition. If the resource does not belong to any partition, it is neither known to nor is accessible to any partition.

Figure 5:
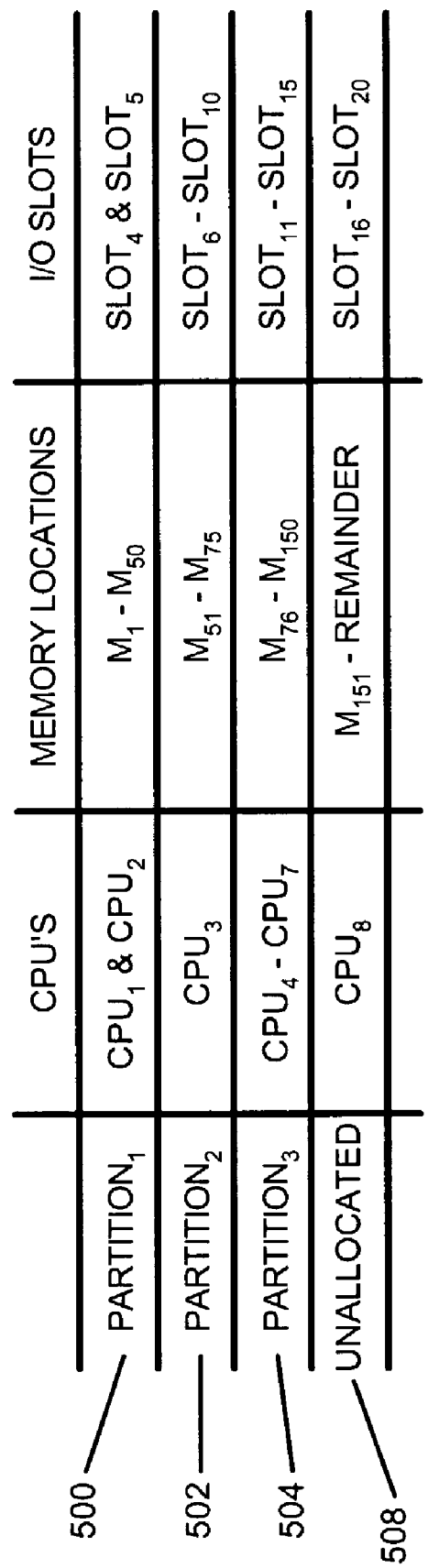
FIG. 5 illustrates a mapping table into which resources belonging to each partition are registered.

The computer system ensures that the resources assigned to one partition are not used by another partition through an LPAR allocation table managed by the HMC. The LPAR allocation table is stored in the NVRAM (non-volatile random access memory) of a service processor. FIG. 5 illustrates such a table. In FIG. 5, $CPU_1$ and $CPU_2$, memory location 1 to memory location 50 (i.e., $M_1$-$M_{50}$) and input/output I/O slot$_4$ and I/O slot$_5$ are mapped to partition$_1$ 500. Likewise, $CPU_3$, $M_{51}$-$M_{75}$ and I/O slot$_6$ to I/O slot$_{10}$ are mapped to partition$_2$ 502 and $CPU_4$ to $CPU_7$, $M_{76}$-$M_{150}$ and I/O slot$_{11}$, to I/O slot$_{15}$ are mapped to partition$_3$ 504. $CPU_8$, the last CPU of FIG. 4 I/O slot$_{16}$ to I/O slot$_{20}$ and $M_{151}$ to the rest of the memory location are shown as being unallocated. The allocation table, shown in FIG. 5, also contains the states and statuses of all the resources in the computer system.

Note that FIGS. 4 and 5 are used as an example and should not be taken as being restrictive. Indeed, some existing computer systems are capable of supporting up to sixteen (16) partitions, each containing at least one CPU, one gigabyte of memory and one I/O slot.

Figure 6:
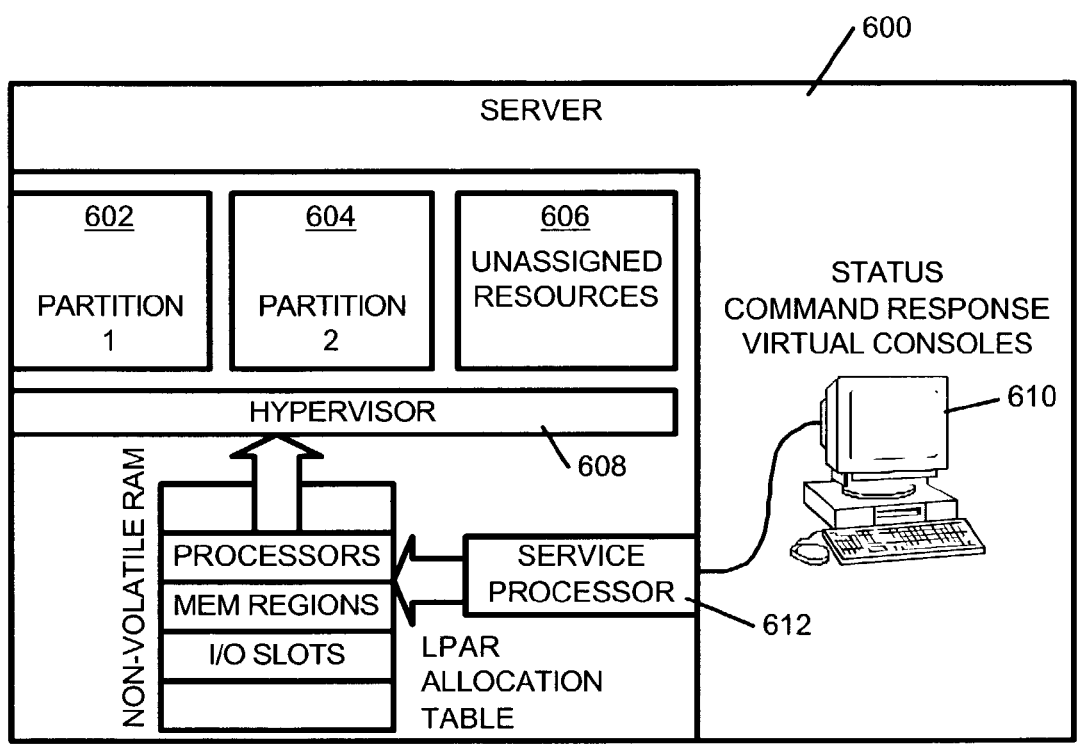
FIG. 6 is an LPAR management system.

FIG. 6 is an LPAR management system. In FIG. 6, a server 600 is shown. The server 600 contains $LPAR_1$ 602, $LPAR_2$ 604 and unassigned resources 606. HMC 610 is connected to service processor 612 through which it manages the LPAR allocation table stored in the NVRAM. When a partition is booted up, the hypervisor 608 references the LPAR allocation table to determine which resources belong to which partition. The LPAR allocation table is not visible to the operating systems (OSs) running in the partitions and thus the OSs cannot update the table.

The hypervisor 608 is stored in a system flash module in the server hardware. During system initialization, the hypervisor 608 is loaded into the first physical address region of system memory. The hypervisor program is trusted to create partition environments, and is the only program that can directly access special processor registers and translation table entries. Partition programs have no way to access the hypervisor's instructions or data, other than through controlled hypervisor service calls that are part of the processor architecture. These protections allow the hypervisor to perform its duties in a simple and rigorous manner, resulting in the confinement of each operating system to a very tight, inescapable box.

Once the partitions are configured, they can be reconfigured by reassigning resources from one partition to another or by assigning unallocated resources to a partition or partitions. In the present invention, the command drmgr (dynamic reconfiguration manager) is used to reconfigure the partitions. This command allows resources to be added or taken away from a partition dynamically (i.e., while the partition is operational). However, only one resource can be added or taken away from a partition at a time. The present invention allows, in the point of view of a user, multiple resources to be added or taken away from a partition at a time.

The HMC provides a user-friendly management interface for performing hardware platform operations, supporting both local and remote user accesses. An HMC user must have a valid user ID and password that has been set up by an HMC administrator. Each HMC user has an assigned role that determines the set of operations that the user is allowed to perform.

Figure 7:
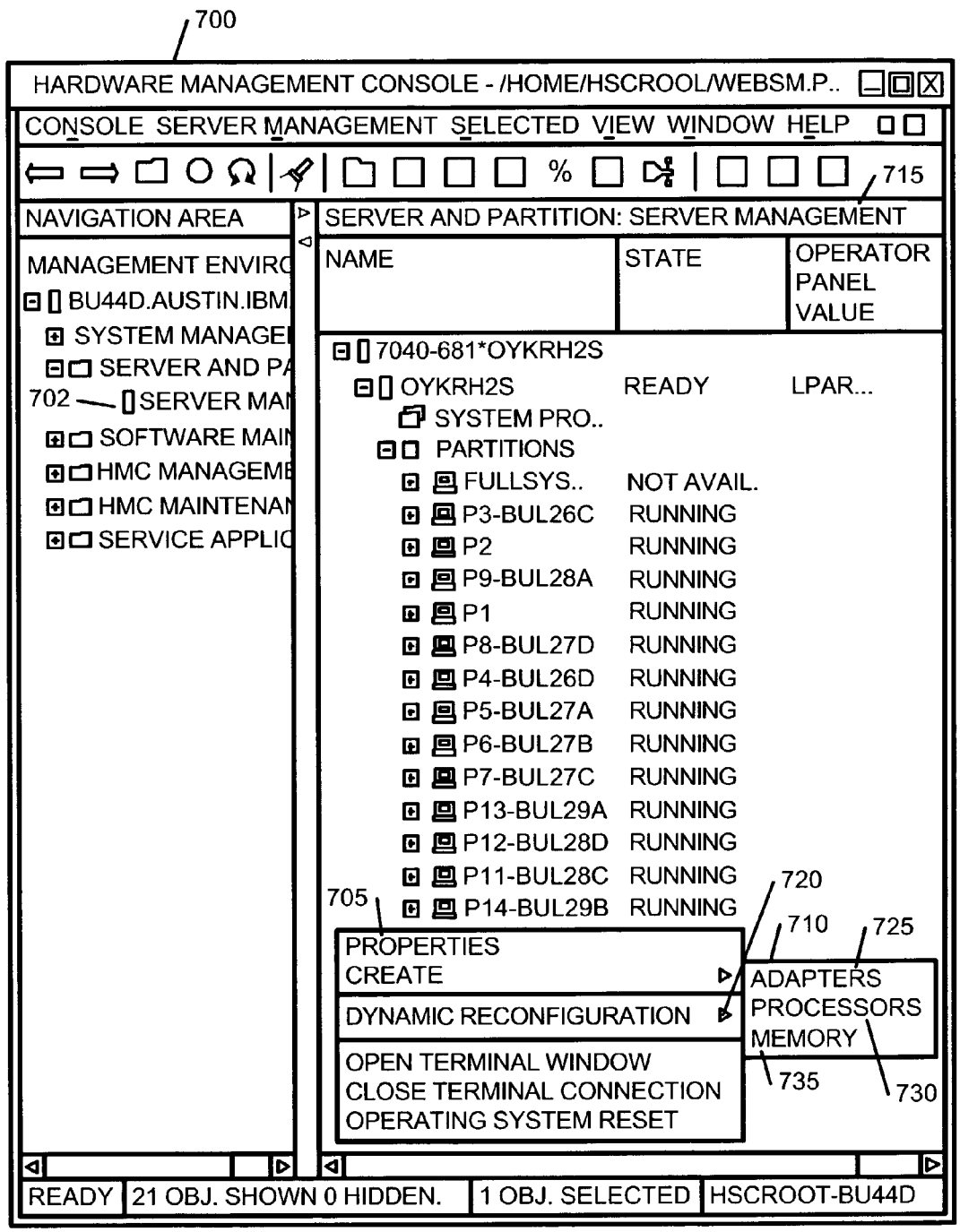
FIG. 7 depicts a screenshot of a graphical user interface (GUI) of an HMC.

FIG. 7 depicts a screenshot of a graphical user interface (GUI) of an HMC. In the figure, server management 702 is selected in the navigation area 700 on the left side of the GUI. In response to the selection, a list of partitions (i.e $p_1$-$p_{15}$) and their status (i.e., running) are displayed in the server and partition management 715 on the right side of the GUI. There, one of the partitions is selected. This can be done by, for instance, clicking the right mouse button while the mouse is over the name of a partition. When this is done, pop-menu 705 is displayed. Pop-menu 705 has a list of choices including dynamic reconfiguration 720. In this particular case, dynamic reconfiguration 720 is selected which causes another menu 710 containing a list of resources to be displayed. If processors 730 is selected, FIG. 8 will be displayed. If memory 735 is selected instead, FIG. 9 will be displayed and if adapter 725 is selected FIG. 10 will be displayed.

Figure 8A:
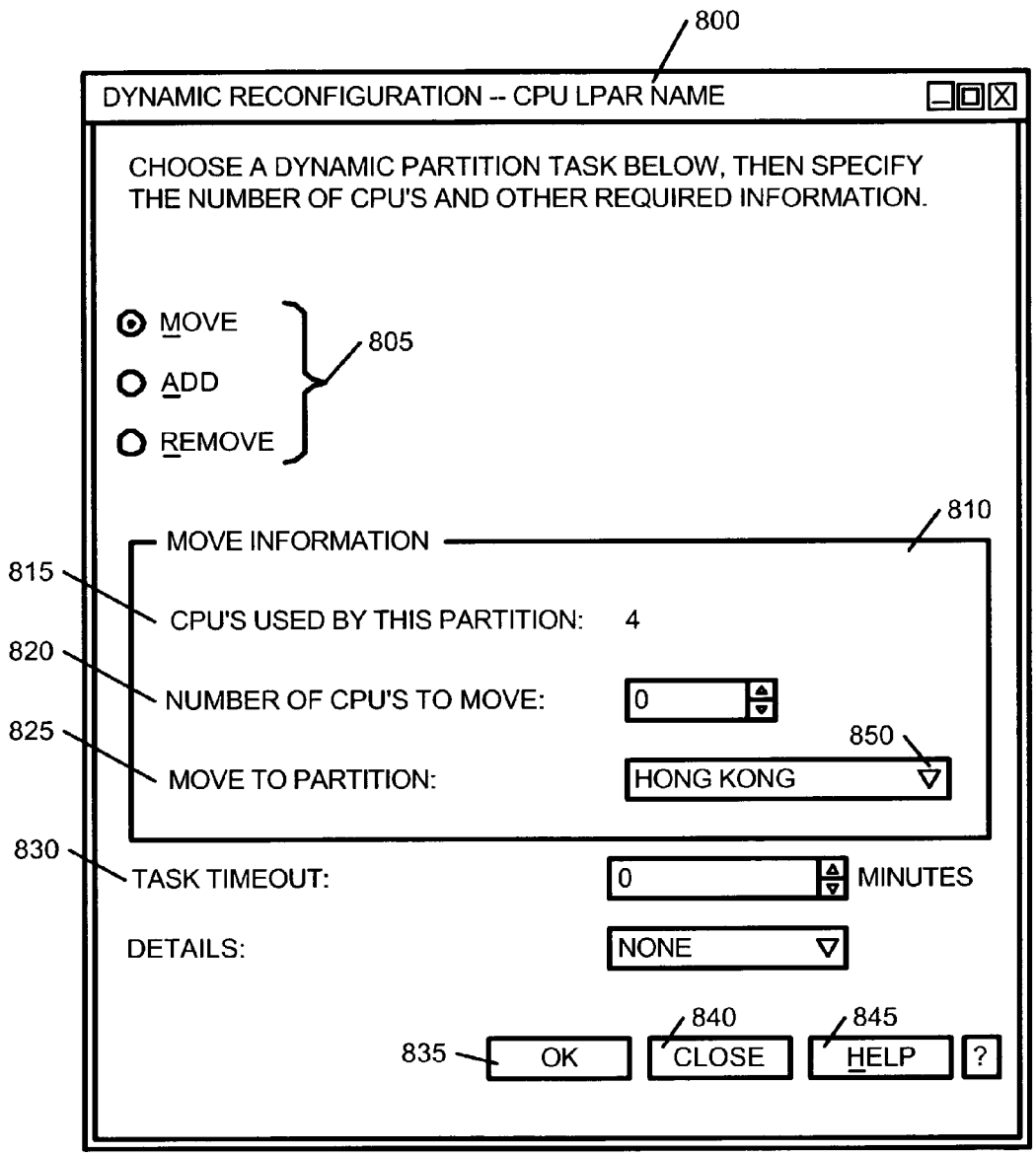
FIGS. 8, 9 and 10 are GUIs that may be used to reconfigure an LPAR.
Figure 8B:
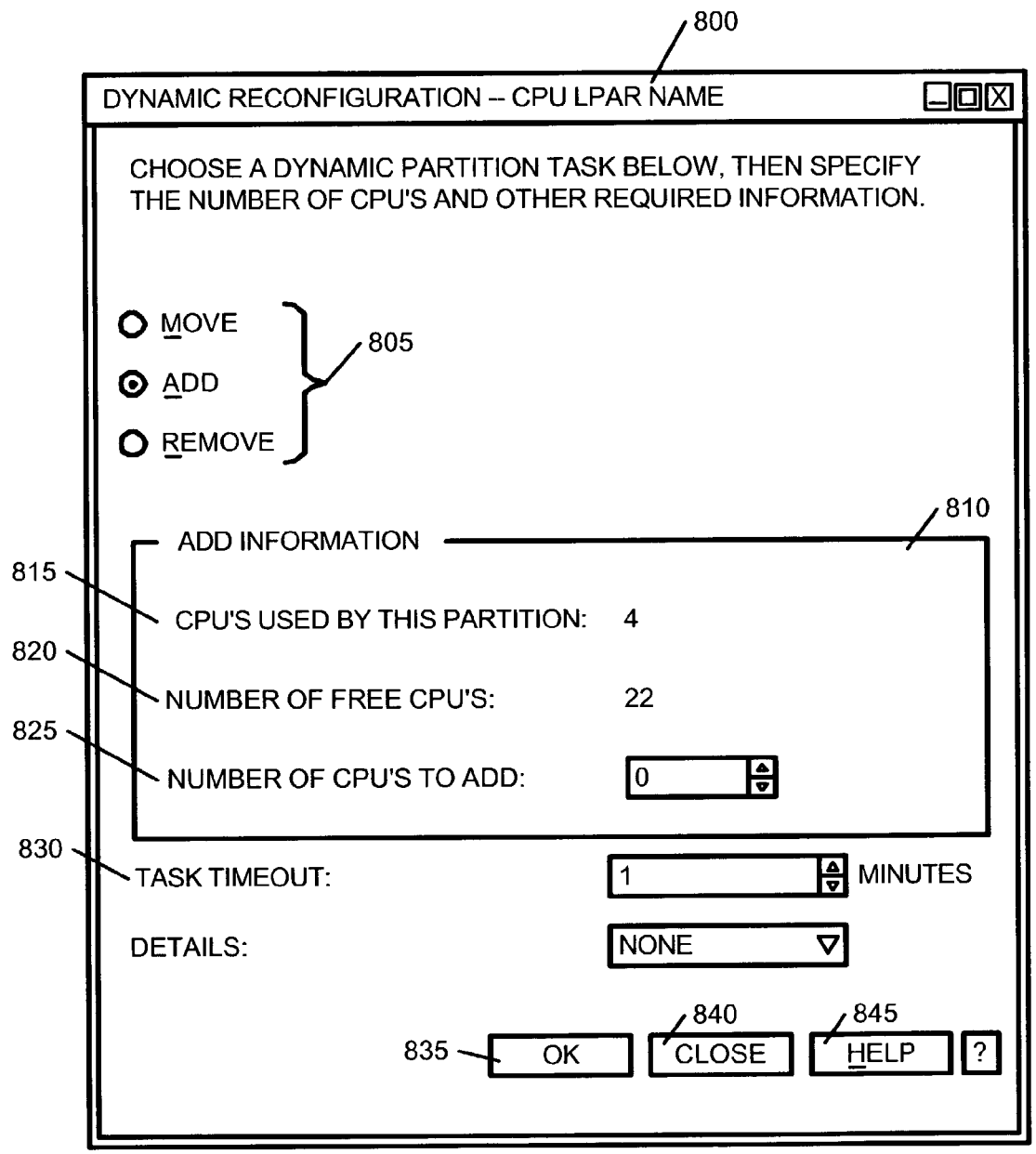
Figure 8C:
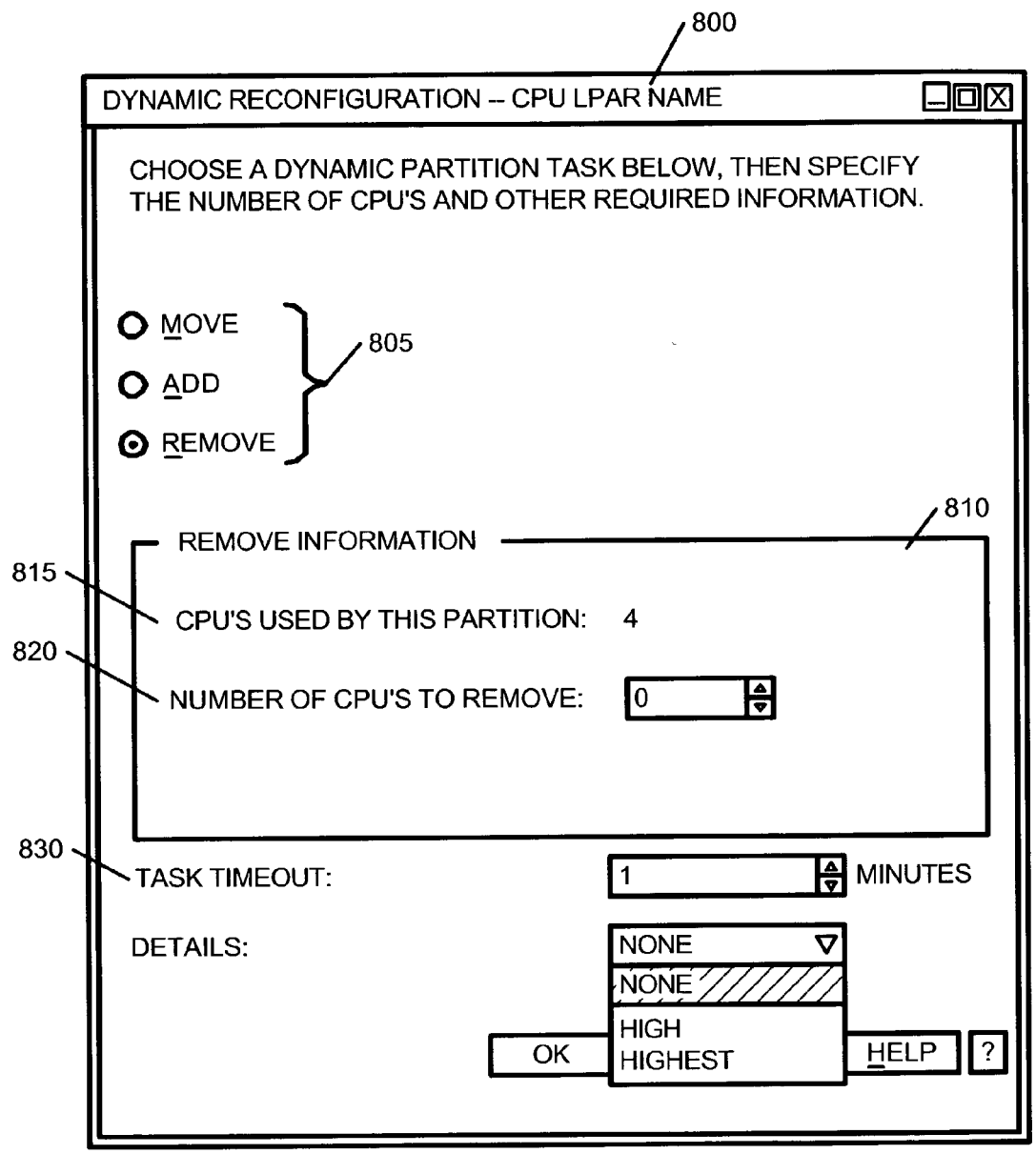

FIG. 8(*a*) is a GUI that may be used to assign or re-assign CPU or CPUs when a partition is being reconfigured. Title bar 800 contains the name of the partition that is being reconfigured. As shown by operation area 805, a user may choose to move, add or remove CPU or CPUs from the partition. In this particular example, CPUs will be moved from the partition identified in title bar area 800 to the partition identified in box 850. The number of CPUs used in the partition is 4 (see numeral 815). The user is required to put the number of CPUs to be moved in box 820. Once this is completed, the user may assert ok button 835 to proceed with the re-configuration or button 840 to abort and close the session. If help is needed, the user may assert help button 845. Task timeout 830 is used to enter a number of minutes that may not be exceeded when the partition is being reconfigured (i.e., after the user has asserted the ok button 835).

FIG. 8(*b*) is a GUI that is displayed when CPU or CPUs are to be added to a partition that is being reconfigured. Here the number of free CPUs (i.e., unassigned) that there are in the computer system is displayed (see numeral 820) and the user has to indicate the number of CPUs that are to be added (see numeral 825). FIG. 8(*c*), on the other hand, is a GUI that is displayed when CPU or CPUs are to be removed from the partition during re-configuration.

Figure 9A:
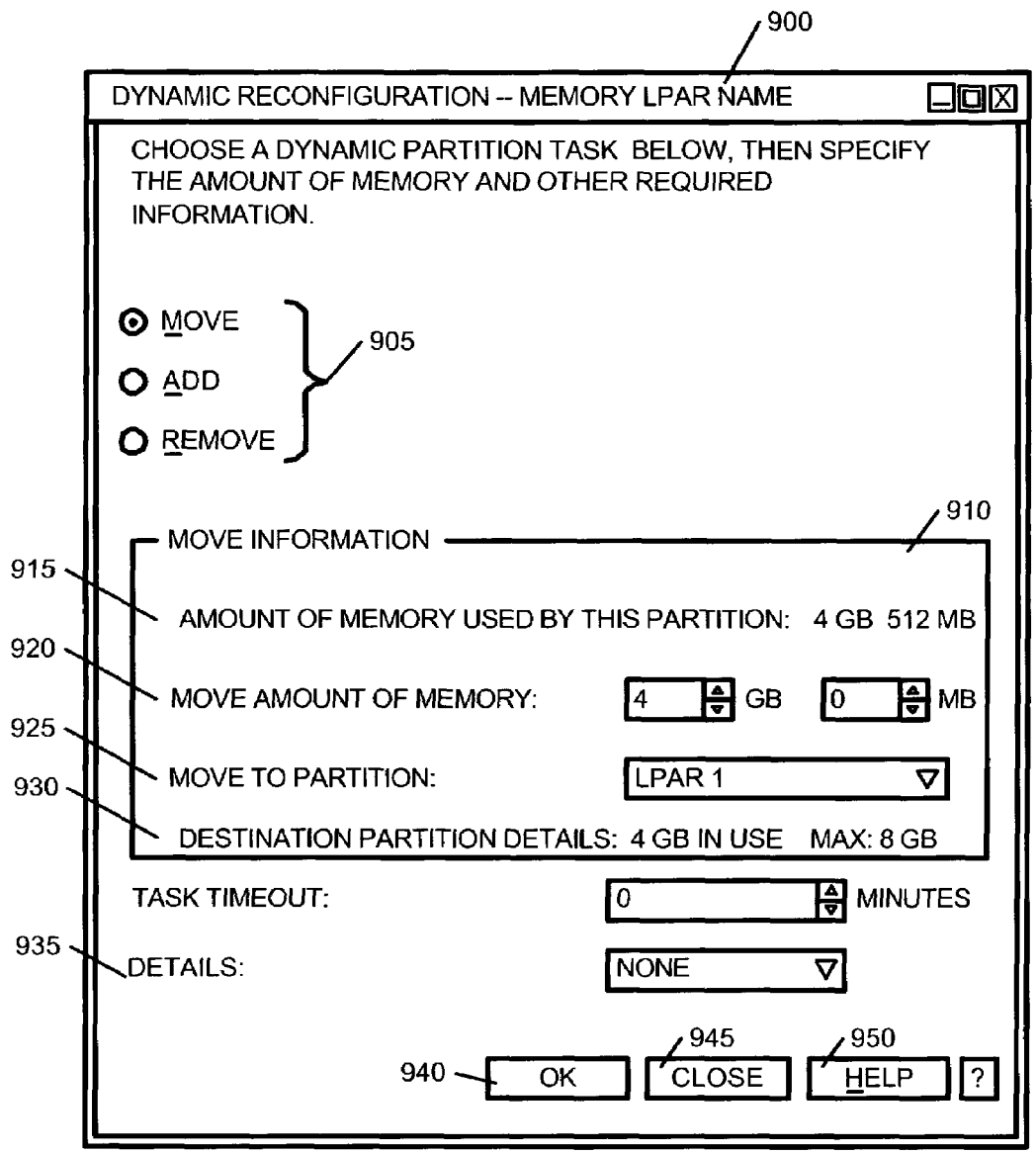

FIG. 9(*a*) is a GUI that may be used to assign or re-assign memory space when a partition is being reconfigured. Title bar 900 contains the name of the partition that is being reconfigured. As shown by operation area 905, a user may choose to move, add or remove memory space from the partition. In this particular example, memory space is being moved from the partition identified in title bar area 900 to the partition identified in box 925. The amount of memory space used in the partition is 4 GB and 512 MB (see numeral 915). The user is required to put the amount of memory space to be moved in box 920. Once this is completed, the user may assert ok button 940 to proceed with the re-configuration or button 945 to abort and close the session. If help is needed, the user may assert help button 950. Task timeout 935 is used to enter a number of minutes that may not be exceeded when the partition is being reconfigured (i.e., after the user has asserted the ok button 940).

Figure 9B:
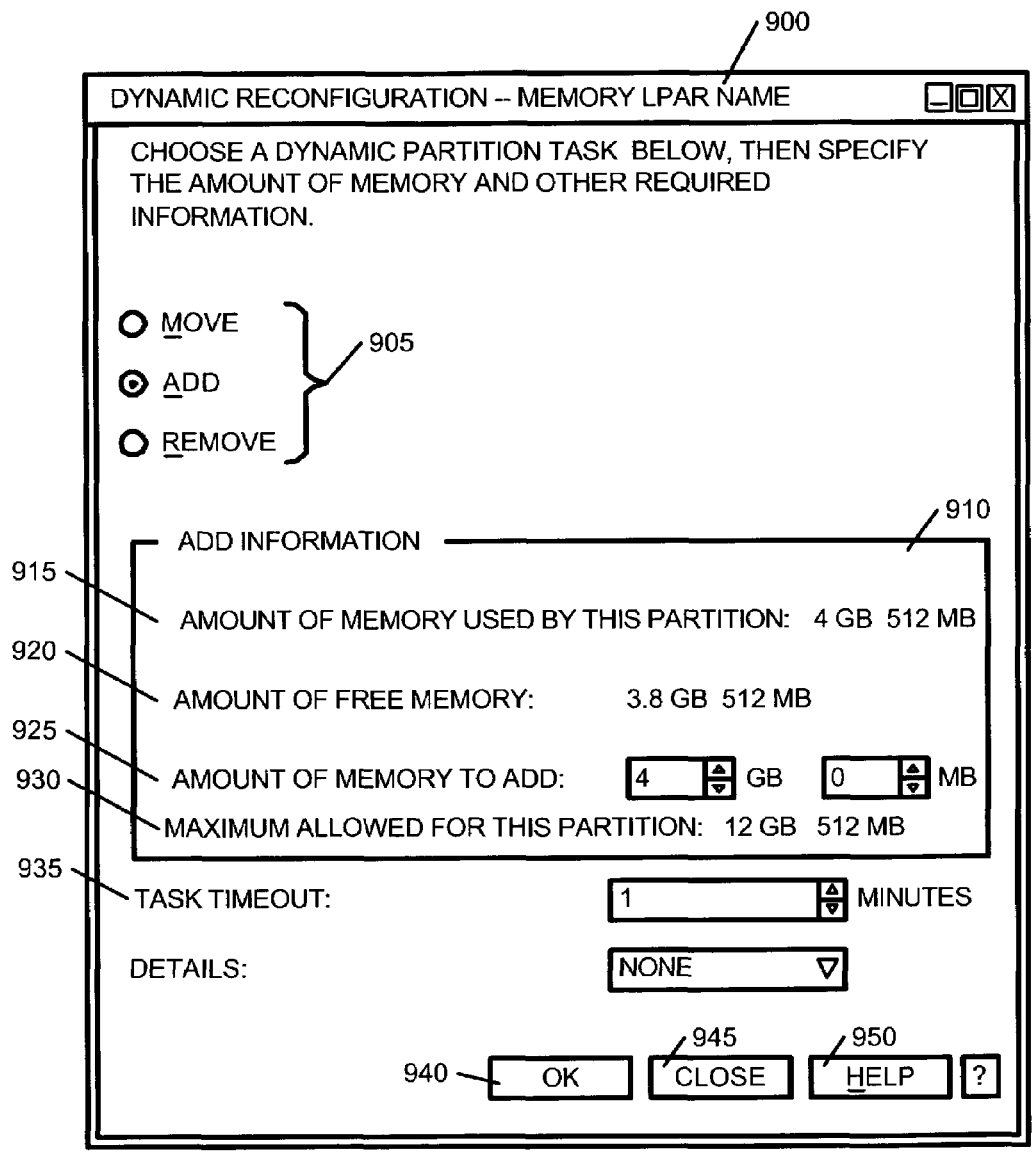
Figure 9C:
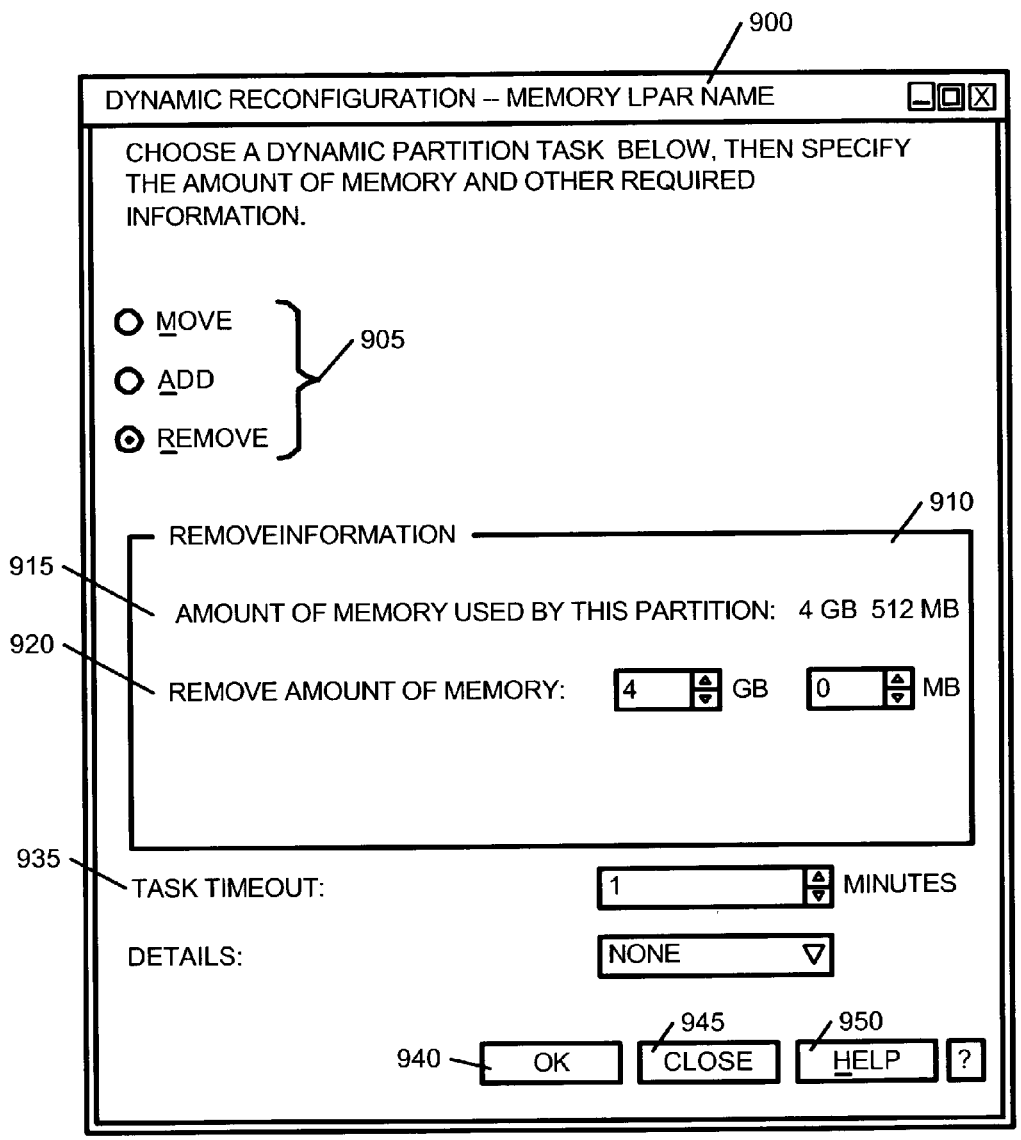

FIG. 9(b) is a GUI that is displayed when memory space is to be added to a partition that is being reconfigured. Here, the amount of free memory space (i.e., unassigned) that there is in the computer system is displayed (see numeral 920) and the user has to indicate the amount of memory space that is to be added to the partition (see numeral 925). FIG. 9(c), on the other hand, is a GUI that is displayed when CPUs are to be removed from the partition during re-configuration.

Figure 10A:
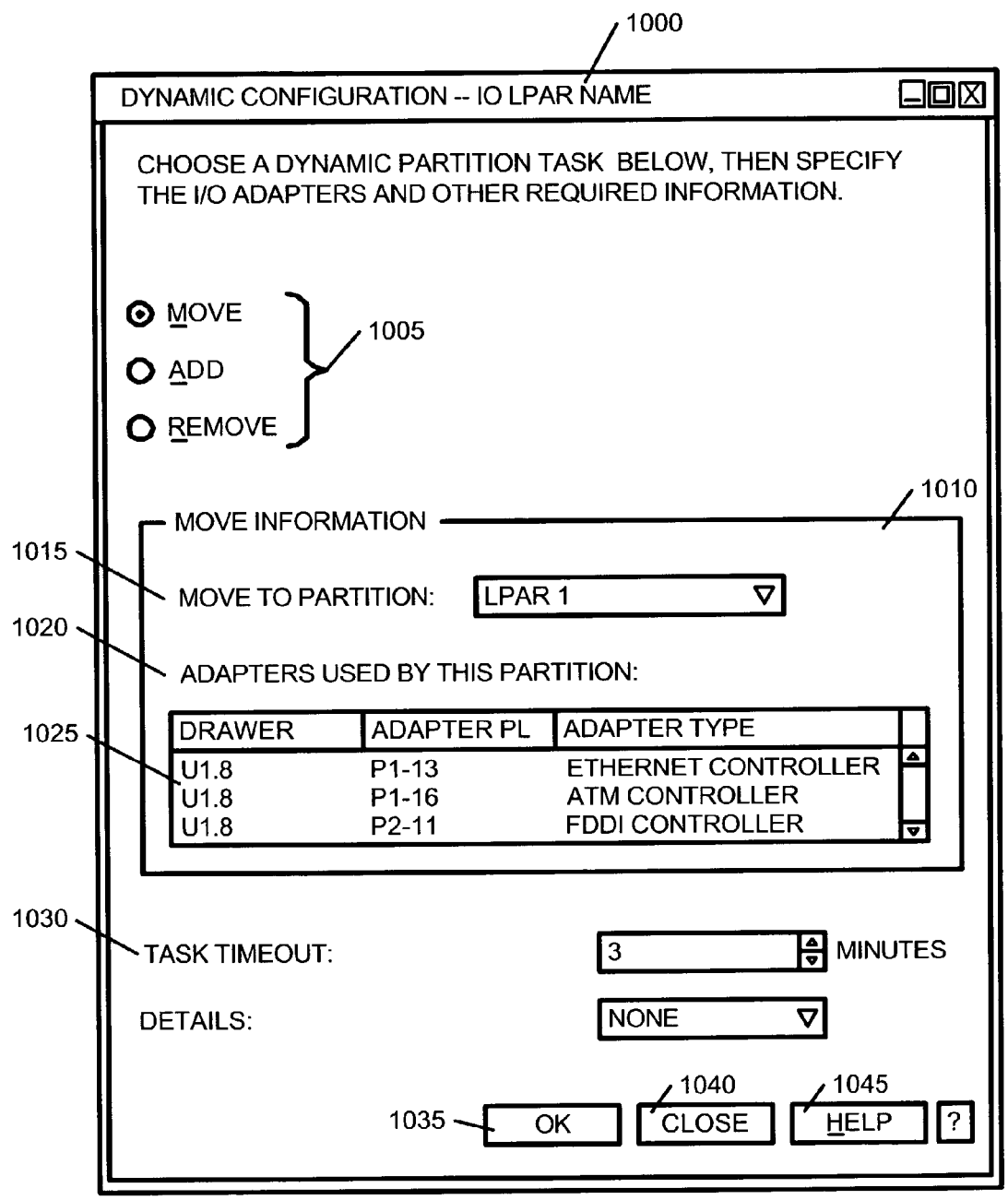

FIG. 10(a) is a GUI that may be used to assign or re-assign I/O adapters when a partition is being reconfigured. Title bar 1000 contains the name of the partition that is being reconfigured. As shown by operation area 1005, a user may choose to move, add or remove I/O adapters from the partition. In this particular example, I/O adapters are being moved from the partition identified in title bar area 1000 to the partition identified in box 1015. The I/O adapters used in the partition is shown in window 1025. The user is required to choose the I/O adapter(s) to be moved in box 1025. Once this is completed, the user may assert ok button 1035 to proceed with the re-configuration or button 1040 to abort and close the session. If help is needed, the user may assert help button 1045. Task timeout 1030 is used to enter a number of minutes that may not be exceeded when the partition is being reconfigured (i.e., after the user has asserted the ok button 1035).

Figure 10B:
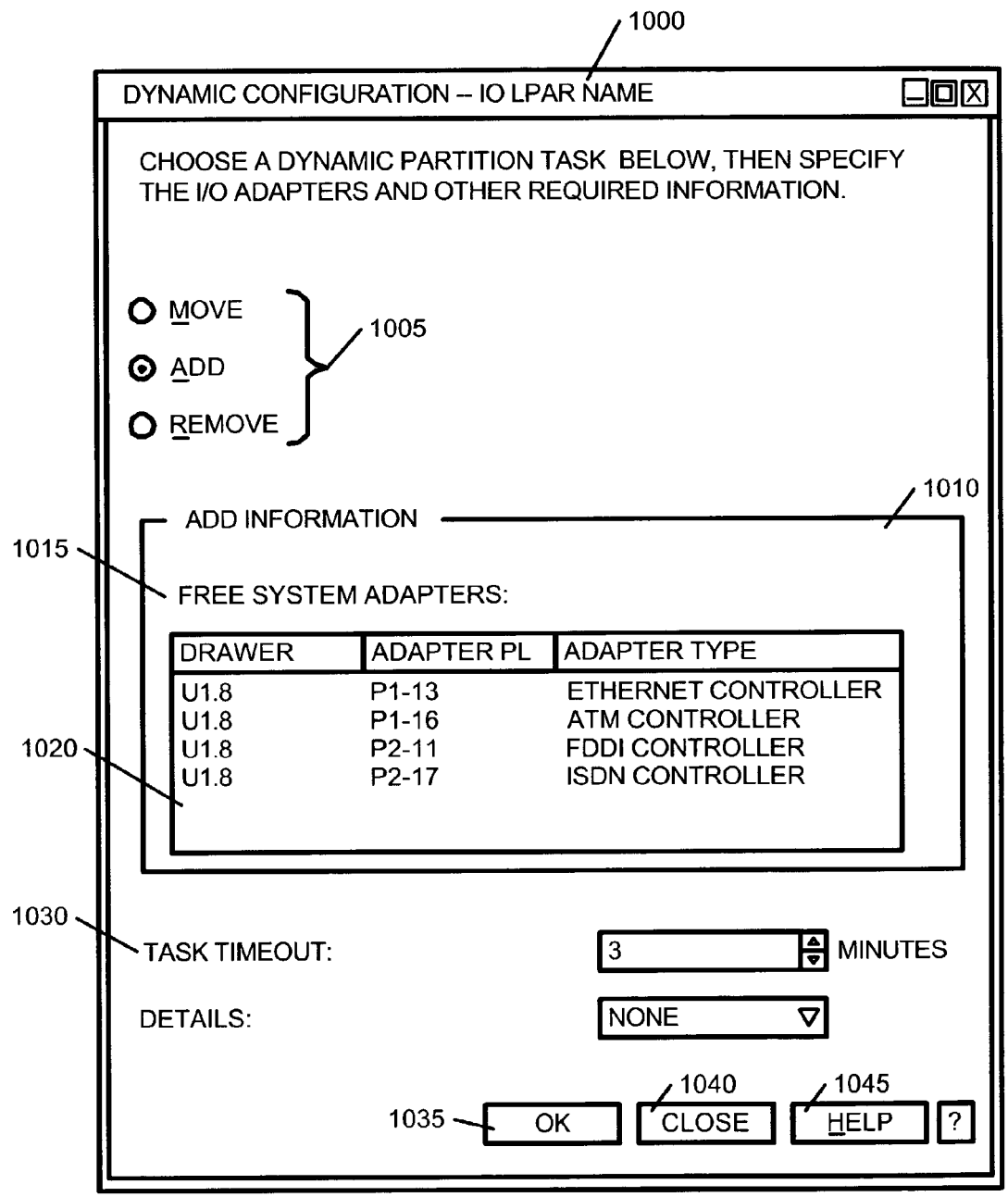
Figure 10C:
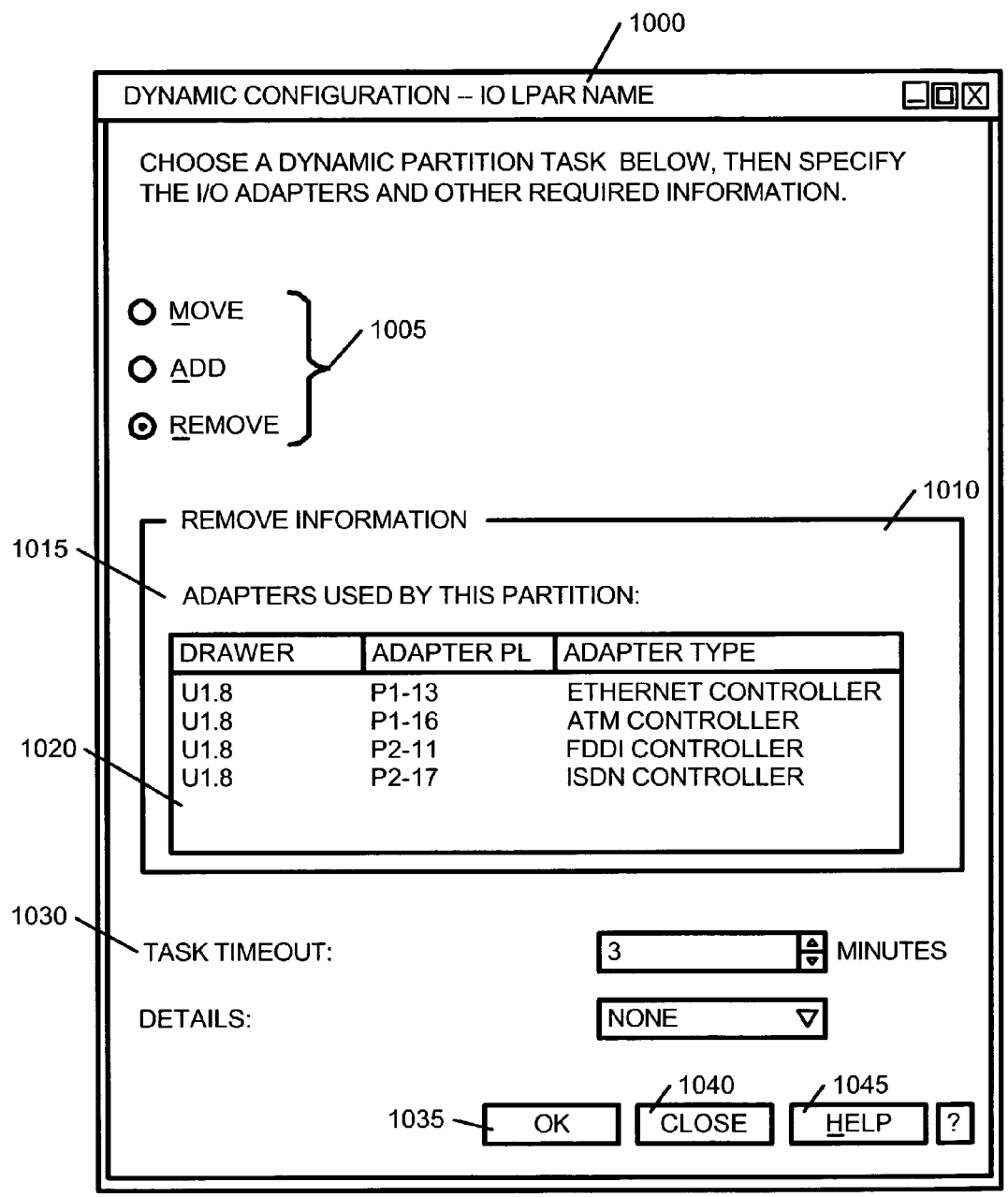

FIG. 10(b) is a GUI that is displayed when I/O adapter or adapters are to be added to a partition that is being reconfigured. Here, the free I/O adapters are shown in window 1020 and the user has to indicate the amount of memory space that is to choose. FIG. 10(c), on the other hand, is a GUI that is displayed when I/O adapter or adapters are to be removed from the partition during re-configuration.

During configuration or re-configuration, the HMC may send as many drmgr commands as there are resources to be added, moved or removed from a partition. For example, for each individual resource that is to be dynamically removed from a partition during a reconfiguration transaction, the HMC will issue an appropriate drmgr command to the target partition to release the resource. When the operating system running on that partition receives the command, it will obey the command and notify the hypervisor of its compliance with the request. The hypervisor will in turn update the LPAR allocation table in the NVRAM, marking each relinquished resource as being in a stopped state. The HMC will then be notified asynchronously of the new states of the resources for display to the user. Then the HMC will mark each resource that is in a stopped state as being unassigned.

Likewise, for each individual resource that is to be added to a partition, a drmgr command will be issued. However, before the command is issued, the HMC will scour the LPAR allocation table looking for unassigned resources or resources assigned to partitions that are not currently running. When the needed resource is found, the HMC will assign it to the target LPAR. After doing so, the appropriate drmgr command will be issued to the target LPAR enabling the LPAR to acquire the resource. In the case of a move transaction, the resource to be moved will first be removed from the appropriate partition and then added to the target partition.

Note that the above-described procedures apply to CPU and I/O slots reconfigurations. For memory reconfigurations, the allocation table in the NVRAM is first adjusted to the new desired memory allocation of the target LPAR. Then, a drmgr command is issued for each logical memory block (LMB) to be dynamically reconfigured.

As in the prior art, a user may enter the drmgr command manually at the command line to reconfigure a partition. When this is done, the user will have to manually update the LPAR allocation table.

The above-described procedure for reconfiguring LPARs has many advantages. For example, it allows a user to perform dynamic reconfiguration (DR) operations of multiple resources at once instead of doing so one at a time. In addition, the HMC is able to keep track of successful DR operations and unsuccessful ones in real-time. Furthermore, the move feature allows resources to be moved dynamically across partitions in a manner that is totally transparent to the user. Particularly, the remove and add aspects of the move feature are abstracted from the user.

Figure 11:
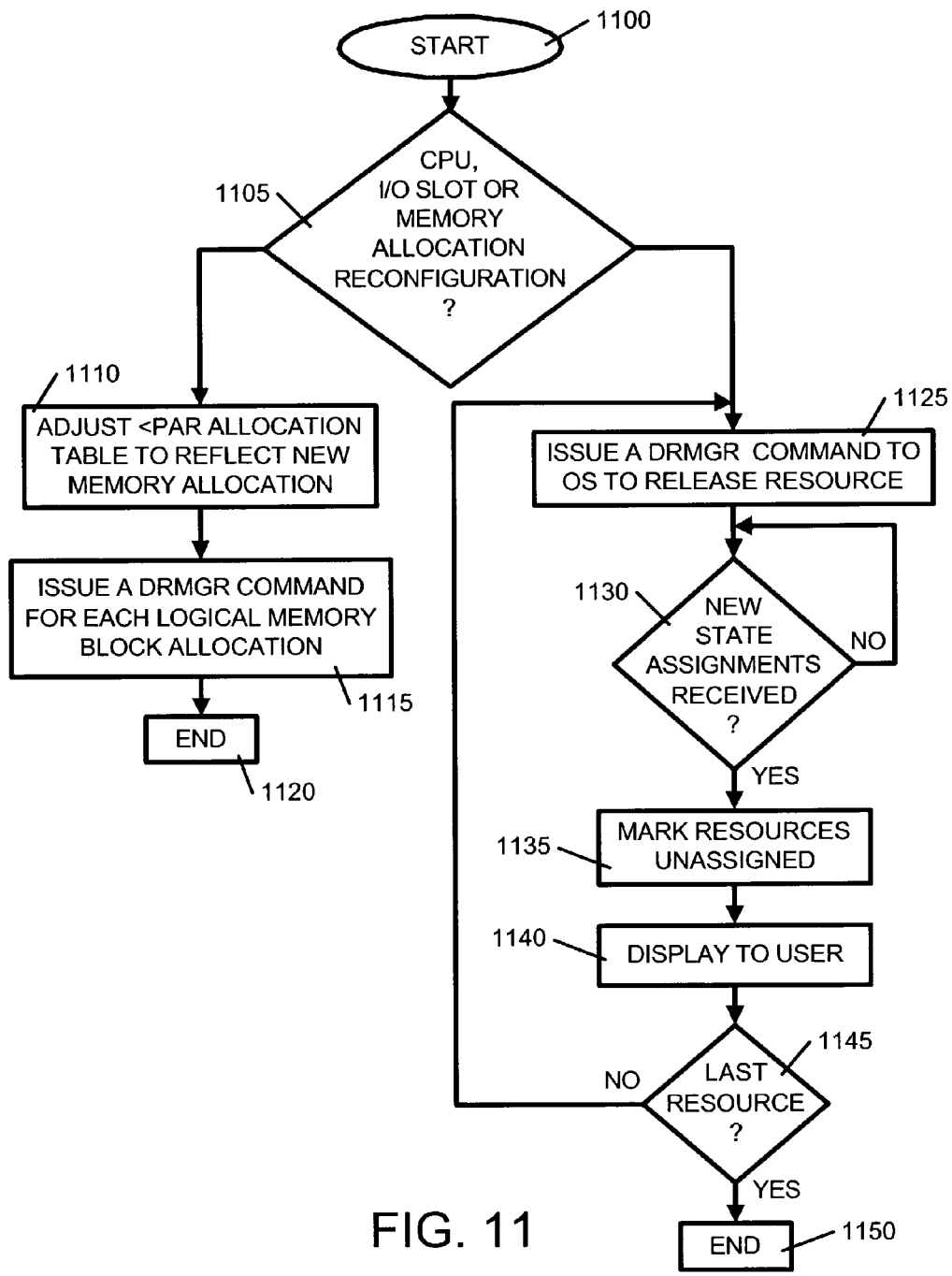
FIG. 11 is a flow chart of process to remove a resource from an LPAR that may be used with the present invention.

FIG. 11 is a flow chart of process to remove a resource from an LPAR that may be used with the present invention. The process starts when the computer system is turned on or is reset (step 1100). Then a check is made to determine whether it is a memory re-configuration that is to be performed. If so, then the LPAR allocation table is adjusted to reflect the new memory reconfiguration. Then an appropriate drmgr command is issued for each LMB that is to be removed and the process ends (steps 1105-1120).

If the reconfiguration involves either a CPU or I/O slot, then an appropriate drmgr command is issued to OS running in the target partition to release the resource. As mentioned before, when the OS has carried out the order, it will inform the hypervisor. The hypervisor then will mark the resource as being in a stopped state and notify the HMC. The HMC then will wait until it receives notification from the hypervisor. Once it receives the notification from the hypervisor, it will mark and display the resource as being unassigned. If it is the last resource to be removed, the process will end. If not the process will return to step 1125 (steps 1105, 1125-1150).

Figure 12:
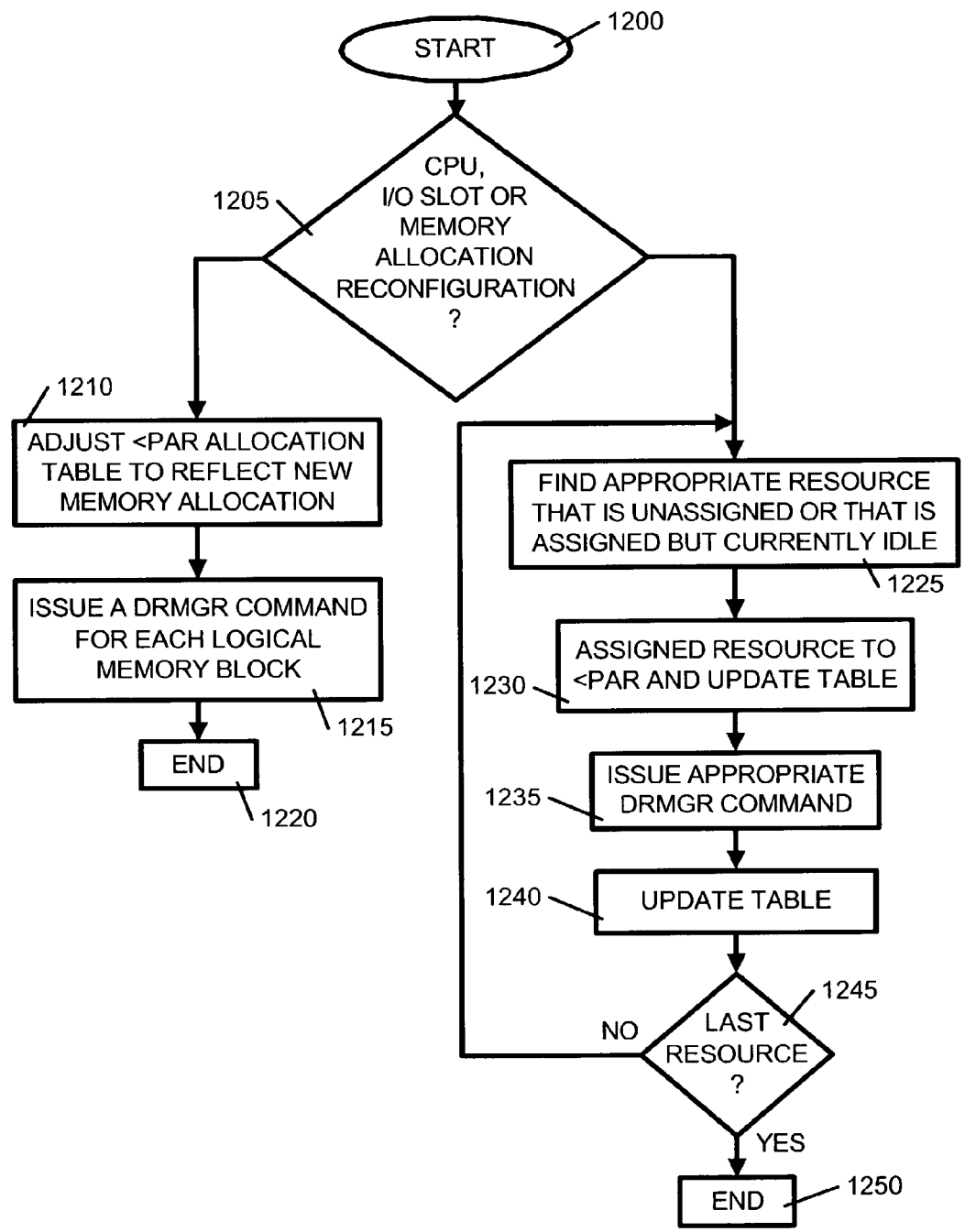
FIG. 12 is a flow chart of process to add a resource to an LPAR that may be used with the present invention.

FIG. 12 is a flow chart of process to add a resource to an LPAR that may be used with the present invention. The process starts when the computer system is turned on or is reset (step 1200). Then a check is made to determine whether it is a memory re-configuration that is to be performed. If so, then the LPAR allocation table is adjusted to reflect the new memory reconfiguration. Then an appropriate drmgr command is issued for each LMB that is to be added and the process ends (steps 1205-1220).

If the reconfiguration involves either a CPU or I/O slot, then the HMC will look for the appropriate resource that is either unassigned. When a resource is found, it will be assigned to the target LPAR and an appropriate drmgr command will be issued to the OS running in the LPAR to acquire the resource. After the OS has acquired the resource, the LPAR allocation table will be updated and the process ends if it is the last resource to be added. if not, the process returns to step 1225 (steps 1205, 1225-1245).

Figure 13:
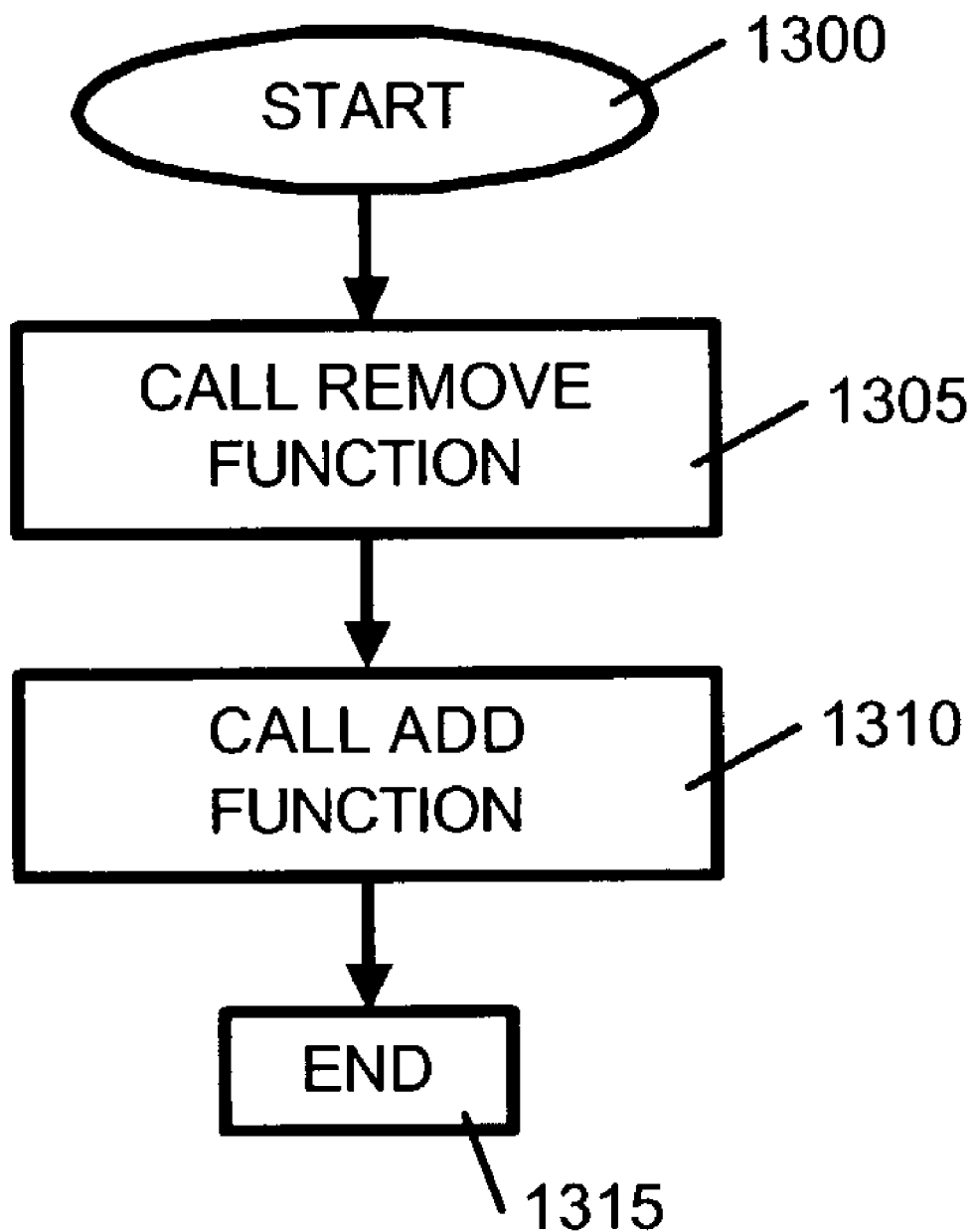
FIG. 13 is a flow chart of process to move a resource from one LPAR to another that may be used with the present invention.

FIG. 13 is a flow chart of process to move a resource from one LPAR to another that may be used with the present invention. The process starts when the computer system is turned on or is reset (step 1300). Then a call is made to remove function (FIG. 11) for each resource that is to be reconfigured. Then a call is made to add function (FIG. 12) for each resource and the process ends steps (1305-1315).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of dynamically reconfiguring partitions of a partitioned computer system, each partition of the partitioned computer system having a plurality of resources, the method comprising the steps of:

enabling a user to indicate a plurality of resources to be involved in reconfiguring a partition; and automatically reconfiguring the partition one indicated resource at a time wherein before the partition is reconfigured a check is made to determine whether the number of a resource will remain within a limit after the partition is reconfigured, wherein if the resource being involved in reconfiguring the partition is memory, an allocation table is adjusted to reflect a new memory allocation to the partition and the partition is reconfigured one logical memory block (LMB) at a time and wherein if reconfiguring the partition entails adding resources to the partition, unassigned resources are first added to the partition.

2. The method of claim 1 wherein if unassigned resources are not available, assigned but idle resources are added to the partition.

3. The method of claim 2 wherein before adding assigned resources to the partition the resources are removed from the partition to which they are currently assigned.

4. A computer program product on a computer readable medium for dynamically reconfiguring partitions of a partitioned computer system, each partition of the partitioned computer system having a plurality of resources, the computer program product comprising:

code means for enabling a user to indicate a plurality of resources to be involved in reconfiguring a partition; and code means for automatically reconfiguring the partition one indicated resource at a time wherein before the partition is reconfigured a check is made to determine whether the number of a resource will remain within a limit after the partition is reconfigured, wherein if the resource being involved in reconfiguring the partition is memory, an allocation table is adjusted to reflect a new memory allocation to the partition and the partition is reconfigured one logical memory block (LMB) at a time and wherein if reconfiguring the partition entails adding resources to the partition, unassigned resources are first added to the partition.

5. The computer program product of claim 4 wherein if unassigned resources are not available, assigned but idle resources are added to the partition.

6. The computer program product of claim 5 wherein before adding assigned resources to the partition the resources are removed from the partition to which they are currently assigned.

7. An apparatus for dynamically reconfiguring partitions of a partitioned computer system, each partition of the partitioned computer system having a plurality of resources, the apparatus comprising:

means for enabling a user to indicate a plurality of resources to be involved in reconfiguring a partition; and means for automatically reconfiguring the partition one indicated resource at a time wherein before the partition is reconfigured a check is made to determine whether the number of a resource will remain within a limit after the partition is reconfigured, wherein if the resource being involved in reconfiguring the partition is memory, an allocation table is adjusted to reflect a new memory allocation to the partition and the partition is reconfigured one logical memory block (LMB) at a time and wherein if reconfiguring the partition entails adding resources to the partition, unassigned resources are first added to the partition.

8. The apparatus of claim 7 wherein if unassigned resources are not available, assigned but idle resources are added to the partition.

9. The apparatus of claim 8 wherein before adding assigned resources to the partition the resources are removed from the partition to which they are currently assigned.

10. A partitioned computer system being able to dynamically reconfigure its own partitions, each partition having a plurality of resources, the partitioned computer system comprising:

at least a storage device for storing code data; and at least a processor for processing the code data to enable a user to indicate a plurality of resources to be involved in reconfiguring each partition, and to automatically reconfigure each partition one indicated resource at a time wherein before the partition is reconfigured a check is made to determine whether the number of a resource will remain within a limit after the partition is reconfigured, wherein if the resource being involved in reconfiguring the partition is memory, an allocation table is adjusted to reflect a new memory allocation to the partition and the partition is reconfigured one logical memory block (LMB) at a time and wherein if reconfiguring the partition entails adding resources to the partition, unassigned resources are first added to the partition.

11. The partitioned computer system of claim 10 wherein if unassigned resources are not available, assigned but idle resources are added to the partition.

12. The partitioned computer system of claim 11 wherein before adding assigned resources to the partition the resources are removed from the partition to which they are currently assigned.

* * * * *